United States Patent [19]

Hoyt et al.

[11] Patent Number: 4,876,315

[45] Date of Patent: Oct. 24, 1989

[54] PROCESS FOR VULCANIZING SATURATED ELASTOMERS WITH HALOGEN CURE SITES

[75] Inventors: John M. Hoyt, Cincinnati; Steven D. Blazey, Akron, both of Ohio

[73] Assignee: National Distillers and Chemical Corporation, New York, N.Y.

[21] Appl. No.: 221,241

[22] Filed: Jun. 6, 1988

Related U.S. Application Data

[62] Division of Ser. No. 938,667, Dec. 5, 1986, abandoned.

[51] Int. Cl.$^4$ .................................................. C08F 8/34
[52] U.S. Cl. .................................. 525/346; 525/330.4; 525/331.1
[58] Field of Search ..................... 525/346, 379, 328.9, 525/330.7, 330.4, 330.5, 331.1, 331.4

[56] References Cited

U.S. PATENT DOCUMENTS 3,919,143  11/1975  Morris ................................. 525/378

Primary Examiner—Christopher Henderson
Attorney, Agent, or Firm—Kenneth D. Tremain; Gerald A. Baracka

[57] ABSTRACT

A composition of matter is disclosed comprising a saturated elastomer having an active halogen-containing cure site, sulfur and a quaternary ammonium salt of a mineral acid. The invention also provides a process for vulcanizing the above composition.

5 Claims, No Drawings

PROCESS FOR VULCANIZING SATURATED ELASTOMERS WITH HALOGEN CURE SITES

This is a division of copending application Ser. No. 938,667, filed Dec. 5, 1986 now abandoned.

BACKGROUND OF THE INVENTION

1. Field of the Invention

The present invention relates to a vulcanizable composition containing a saturated elastomer having active halogen-containing cure sites, a quaternary ammonium salt of a mineral acid, and sulfur and to the process of vulcanizing same.

2. Description of the Prior Art

Elastomeric polymers have been vulcanized with sulfur to improve elasticity, resistance to cold flow and strength. The polymers upon vulcanization lose their tackiness, become insoluble in solvents, and their resistance to deterioration by heat and light is improved.

Conventional sulfur vulcanization can be carried out with elastomers through unsaturation present in the elastomer molecules. The unsaturation is either introduced when the polymer is formed or may be introduced into the polymer molecules after the polymer is formed by methods that are known in the art. For example, ethylene-vinyl acetate copolymers (EVA) may be vulcanized by introducing unsaturation by thermal or catalytic deacetylation with a protonic or Lewis acid under a vacuum of less than about 50 Torr while continuously removing acetic acid released during the deacetylation. A heated vacuum double screw extruder may be used for this urpose and olefinically unsaturated linear polymers produced as described by Bernhardt et al. in U.S. Pat. No. 4,004,069. These polymers may be cross-linked or vulcanized with sulfur according to Bernhardt et al. Ger. Offen. 2,413,064.

Vulcanization can also be accomplished through highly reactive halogen-containing cure sites and vulcanization of saturated acrylic elastomers containing halogen cure sites using soap/sulfur cure systems is widely practiced. Mihal U.S. Pat. No. 3,458,461 discloses the vulcanization of acrylate ester elastomers containing small amounts (approx. 5% or less) of copolymerized vinyl chloroacetate (VCA) units as cure sites using cure systems comprising a soap, such as sodium or potassium stearate, in combination with elemental sulfur. Grafting of mixtures of acrylate esters and vinyl chloroacetate onto EVA elastomers and curing of the resulting grafted polymer products with soap/sulfur systems is described by Chang et al. in U.S. Pat. No. 4,202,845. Kaiserman et al. in U.S. Pat. No. 3,972,857 describe soap/sulfur vulcanization of EVA elastomers containing activated halogen atoms as sites for sulfur vulcanization. The chlorine- or bromine-containing functional groups may be incorporated into the ethylene-vinyl acetate copolymer either by copolymerization of a vinyl monomer containing the functional group with ethylene and vinyl acetae to provide a random terpolymer or by chemically modifying a copolymer of ethylene and vinyl acetate by reaction of the acetate functional group of the copolymer with a chlorine- or bromine-containing reagent. Preferably, the sites are -chloroacetoxy groups which are substituted for some of the acetoxy groups of the EVA copolymer by acidolysis with chloroacetic acid. Behrens in U.S. Pat. No. 3,939,128 discloses a vulcanizable composition comprising a halogen- or epoxy-containing polyacrylate elastomer, 0.05 to 2.5 parts sulfur and 0.5 to 7 parts sodium or potassium salt of 2-ethylhexanoic acid.

Morris in U.S. Pat. No. 3,919,143 describes the vulcanization of halogen-containing elastomeric polymers utilizing a cure system which can include a di- or polyfunctional carboxylic acid, a quaternary ammonium salt and a halide ion acceptor, such as an alkali or non-alkali metal salt of a monocarboxylic acid. Sulfur is not employed in the Morris cure system; in fact, it is shown to adversely affect the vulcanization. In the control experiment set forth in Table A, the inclusion of sulfur with a carboxylic acid soap and quaternary ammonium salt is shown to produce a vulcanizate having a very low tensile strength (570 psi) and high elongation (470%) after curing for 30 minutes at 320° F.—indicating a low degree of vulcanization.

SUMMARY OF THE INVENTION

Quite unexpectedly and contrary to the teachings of the prior art, Applicants have now discovered that saturated elastomers having active halogen-containing cure sites can be effectively vulcanized utilizing a cure system consisting of a quaternary ammonium salt of a mineral acid and sulfur. The quaternary ammonium salt/sulfur cure systems yield vulcanizates having useful physical properties and provide an additional degree of freedom of choice of cure systems for elastomers containing active halogen cure sites.

In accordance with the present invention, a composition of matter, vulcanized or unvulcanized, comprising a saturated elastomer having active halogen-containing cure sites, a quaternary ammonium salt, and sulfur is provided. Other conventional compounding ingredients may also be present in the composition. The invention also relates to a method for vulcanizing saturated elastomers having active halogen-containing cure sites by combining them with sulfur and a quaternary ammonium salt followed by curing.

More specifically, the compositions of this invention comprise a saturated elastomer having active halogen-containing cure sites, 0.05 to 2.5 phr sulfur, and 0.05 to 7 phr quaternary ammonium salt of a mineral acid. The quaternary ammonium salts correspond to the formula

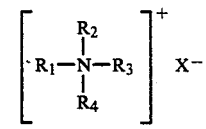

wherein $R_1$, $R_2$, $R_3$, and $R_4$ are hydrocarbon radicals having from 1 to 18 carbon atoms and $X^-$ is $Cl^-$, $Br^-$, $I^-$, $HSO_4^-$, or $H_2PO_4^-$. Saturated elastomers useful for the invention are copolymers of ethylene and a vinyl ester of from 3 to 6 carbon atoms and having active halogen-containing cure sites incorporated therein by polymerizing a vinyl monomer containing said halogen-containing group or by chemically modifying the copolymer by reacting a portion of the ester groups with a halogen-containing reagent and poly(ethyl acrylate) or a copolymer of ethyl acrylate with n-butyl acrylate and having active halogen-containing cure sites incorporated therein by copolymerizing or terpolymerizing a vinyl monomer containing said halogen-containing group.

DETAILED DESCRIPTION OF THE INVENTION

The cure systems of the invention are effectively utilized with saturated elastomers having active halogen cure sites. In one embodiment of the invention, the active halogen-containing sites are incorporated into an ethylene-vinyl ester copolymer either by terpolymerizing a vinyl monomer containing the functional group or by chemically modifying the copolymer by reacting a portion of the ester groups with a halogen-containing reagent, such as chloroacetic acid. The ethylene-vinyl ester elastomer contains from about 25 to about 60 weight percent ethylene and from about 35 to about 70 weight percent vinyl ester having from 3 to 6 carbon atoms, e.g., vinyl formate, vinyl acetate, vinyl propionate, vinyl butyrate, and the like. Vinyl acetate is preferred.

The EVA terpolymer elastomers generally contain from 0.2 percent to about 8 percent by weight of an active halogen-containing cure site monomer provided by a member selected from the group consisting of halogenated vinyl esters and vinyl ethers having from 1 to about 3 halogen atoms and from 4 to about 10 carbon atoms. The halogen can be chlorine, bromine and iodine, however, chlorine and bromine are preferred. A particularly useful active halogen-containing cure site monomer comprises vinyl chloroacetate in which case the elastomer is an E/VA/VCA terpolymer. Other cure site monomers that may be used include vinylbenzyl chloride and epoxy monomers, such as glycidyl methacrylate and vinyl glycidyl ether.

EVA copolymers and terpolymers employed are produced by processes known in the art such as those described by Roedel in U.S. Pat. Nos. 2,703,794 and 2,519,791; French, U.S. Pat. No. 3,509,115; and Hanford, U.S. Pat. No. 2,396,785. Elastomeric copolymers and terpolymers with high Mooney viscosities may be prepared by emulsion polymerization, for example, as disclosed by Heimberg, U.S. Pat. No. 4,287,329, and by Heimberg et al., copending U.S. patent application filed herewith.

In another embodiment of this invention, the saturated elastomer can be an acrylate ester elastomer also containing vinyl chloroacetate cure sites. Such elastomers are based principally on poly(ethyl acrylte) and copolymers of ethyl acrylate with n-butyl acrylate. The acrylate ester polymers that may be advantageously vulcanized using the quaternary ammonium salt/sulfur cure systems of the invention possess highly reactive cure sites. The cure sites are haloacetoxy groups which may be introduced into the polymer during synthesis by co- or terpolymerizing a vinyl haloacetate, such as vinyl chloroacetate, with the other monomer(s). For example, VCA cure sites are introduced into acrylate ester polymers by copolymerization (see U.S. Pat. No. 3,201,373).

The saturated acrylic elastomers will contain from about 0.06 to about 2.4 weight percent halogen (e.g., chlorine) and, more generally, from about 0.3 to about 1.5 weight percent halogen.

Quaternary ammonium salts of a mineral acid which can be used are known in the art. Such quaternary ammonium salts are widely used as phase transfer catalysts to promote reactions between reactive moieties separated by phase boundaries [see, for example, W. P. Weber and G. W. Gokel, "Phase Transfer Catalysis in Organic Synthesis," Springer-Verlag, Berlin, 1977 and C. M. Starks, *J. Am. Chem. Soc.*, 93, 195 (1971)] and for a variety of other applications. Quaternary ammonium salts of mineral acids useful for the invention correspond to the formula:

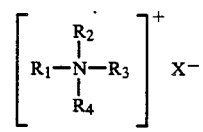

where $R_1$, $R_2$, $R_3$ and $R_4$ are hydrocarbon radicals containing from 1 to about 18 carbon atoms, which may be alkyl, aryl, aralkyl or alkaryl, and which may be the same or different. The anion $X^-$ is derived from a protonic mineral acid and may be $Cl^-$, $Br^-$, $I^-$, $HSO_4^-$, $H_2PO_4^-$, and the art known equivalents thereof. Examples of the aforesaid quaternary ammonium salts are tetramethylammonium chloride, tetramethylammonium bromide, tetraethylammonium iodide, tetrabutylammonium bisulfate, benzyltriethylammonium chloride, hexadecyltributylammonium chloride, decyltriethylammonium bromide, myristyltrimethylammonium bromide, octadecyltributylammonium chloride, trioctylpropylammonium chloride, methyltrialkyl ($C_8$–$C_{10}$) ammonium chloride, and the art known equivalents thereof.

It is also within the scope of the invention to employ in place of quaternary ammonium salts the related phosphonium salts. Phosphonium analogs of the quaternary ammonium salts described above, e.g., hexadecyltributylphosphonium bromide and the like, may be employed.

The quaternary ammonium or phosphonium salt concentration will range broadly from about 0.5 to about 7 parts and especially from about 2 to about 6 parts per 100 parts of polymer. More than one quaternary ammonium salt may be used at a time either as mixtures or added individually to the composition of the invention during mixing.

All "parts" of the composition as set forth herein are parts by weight unless otherwise indicated. The expression "phr" means parts per 100 parts of elastomer.

The compositions and process of the present invention differ from conventional phase transfer systems utilizing quaternary ammonium salts in that no water is employed—the organic elastomer and the compounding ingredients constitute the two phases of the system. While no water is intentionally added, some water in an amount on the order of 0.5% by weight or less may be present. The water may be present in the elastomers as a result of the method of synthesis, e.g., emulsion polymerization in water, or may be associated with other ingredients in the composition.

The sulfur is employed in an amount from about 0.05 to about 2.5 phr and, more usually, from about 0.2 to about 1.3 phr. The sulfur is preferably in the elemental form such as the ground sulfur of commerce, especially ground rhombic sulfur crystals, however, sulfur compounds capable of liberating sulfur at vulcanizing temperatures may also be used either alone or in combination with the the elemental sulfur. Equivalent amounts of the sulfur compounds will be employed based on the sulfur contents of said compounds. Such sulfur compounds include tetramethylthiuram disulfide and its homologs, the corresponding tetrasulfide, dipentamethylene thiuram hexasulfide, 4,4'-dithiobismorpholine, sulfur chlorides, and the like. Sulfur compounds should be soluble in the polymer or available in a finely divided form so they can be readily and uniformly dispersed in the polymer.

The polymers to be vulcanized are typically compounded on a 2-roll rubber mill. The compounding temperature is maintained in the range of from about 140° to about 170° F. Temperatures above about 180° F. are generally to be avoided during compounding. Compounding times generally do not exceed about 25 minutes. Other compounding equipment may be used, e.g., a Banbury mixer, a tin screw processor and the like, but a 2-roll rubber mill is preferred.

Conventional compounding ingredients can be included in the elastomer with the quaternary ammonium salt and sulfur. Such ingredients can include but are not limited to fillers, colorants, reinforcing agents, stabilizers, antioxidants, processing aids, accelerators, plasticizers, scorch retarders, flame retardants, promoters and the like, all of which are known in the art. Certain of the compounding ingredients may have more than one function.

Various antioxidats which can be used in the vulcanization include: phenyl-beta-naphthylamine, di-beta-napthyl-p-phenylene diamine, Agerite Resin D (trademark), and the like. Various filler/reinforcing agents which may be incorporated into the elastomer composition, although it is within the scope of the invention to vulcanize unfilled compositions, include: carbon black; e.g., furnace blacks such as fast extruding furnace (FEF) black and high abrasion furnace (HAF) black, channel blacks, thermal blacks, and the like. Other common filler/reinforcing agents which may be employed include silica, alumina, clays, diatomaceous earth, barium sulfate, glass fibers and the like. Long chain monocarboxylic acids are also commonly included but their function in the present case has not been established. The monocarboxylic acids typically contain from about 6 to about 22 carbon atoms, may be linear or branched, and may be saturated or contain one or more carbon-carbon double bond. $C_{12-18}$ fatty acids and mixtures of said acids are particularly useful. Examples of useful monocarboxylic acids include: lauric acid, myristic acid, palmitic acid, oleic acid, linoleic acid, stearic acid, isostearic acid, behenic acid and the like.

In one embodiment of the invention particularly useful vulcanizates are obtained when a $C_{12-22}$ aliphatic monocarboxylic acid, an antioxidant, and carbon black are incorporated into the elastomer with the quaternary ammonium salt and sulfur. In general, from 0.3 to 5 phr and, more preferably, from 1 to 3 phr monocarboxylic acid is employed. $C_{12-18}$ monocarboxylic acids and mixtures of fatty acids, particularly those derived from natural fats and oils wherein the predominant acids contain from 12 to 18 carbon atoms, are most advantageously utilized. About 0.25 to 1.5 phr antioxidant is used and Agerite Resin D (trademark) is preferred. Optimal physical properties are achieved by the incorporation of from 25 to 100 phr and, more preferably, 30 to 60 phr carbon black. Fast extruding furnace (FEF) black is preferred.

In a particularly useful embodiment of the invention, EVA copolymers and ethyl acrylate homopolymers and copolymers containing α-chloroacetoxy groups and 0.3 to 1.5 percent chlorine are formulated with 2 to 6 phr quaternary ammonium salt, 0.2 to 1.3 phr sulfur; 1 to 3 phr $C_{12-18}$ monocarboxylic acid or mixture of $C_{12-18}$ monocarboxylic acids; 0.25 to 1.5 phr antioxidant; 30 to 60 phr carbon black; and vulcanized.

In yet another embodiment of the invention the quaternary ammonium salt is added to the formulation last, either by itself or, more preferably, in admixture with a portion of the carbon black. Other compound ingredients, including the sulfur and the bulk of the carbon black, are blended into the elastomer prior to addition of the quaternary ammonium salt.

The formulated elastomers of the invention are cured by applying heat thereto until the desired degree of crosslinking is achieved. Cure temperatures will generally be on the order of from about 100° C. to about 250° C. The preferred temperature range is from about 130° C. to about 200° C. The cure time depends on the cure temperature, i.e., where high temperatures are employed the time required to develop optimal physical properties of the vulcanizate will be shorter than when the polymer is vulcanized at lower temperatures. However, vulcanization time will usually be on the order from about 1 to about 150 minutes. Cure times of from about 1 to about 30 minutes are preferred. The vulcanized elastomers of this invention find utility as gaskets, seals, spark plug boots, hoses, and the like.

The invention is illustrated in the examples that follow. In these examles, chlorine contents were determined by the choninger method. Tensile strength and elongation of the sulfur vulcanized elastomers were determined according to ASTM D 412. Mooney viscosity was determined according to ASTM D 1646-68. Where "Mooney viscosity" is cited hereinafter it means Mooney viscosity, ML(1+4) @ 100° C. and is abbreviated as "MV."

EXAMPLE I

A commercially available ethyl acrylate-vinyl chloroacetate elastomer [Cyanacryl R (trademark) manufactured by American Cyanamid Co.] containing 0.9 weight percent chlorine with a MV of 38 was vulcanized in accordance with the present invention. The quaternary ammonium salt used was myristyltrimethylammonium bromide (MTMAB). The elastomer composition was formulated as follows:

|  | Parts |
|---|---|
| Ethyl Acrylate-Vinyl Chloroacetate Elastomer | 100 |
| Agerite Resin D (trademark)* | 1.0 |
| Sulfur | 0.3 |
| Stearic Acid | 2.0 |
| Carbon Black** | 46.0 |
| Mixture of: |  |
| Carbon Black** | 4.0 |
| MTMAB | 3.0 |

*polymerized 1,2-dihydro-2,2,4-trimethylquinoline manufactured by R. T. Vanderbilt Co., Inc.
**N 550 fast extruding furnace (FEF) black manufactured by Phillips Petroleum Co.

The ingredients were milled into the elastomer in the order shown. A standard 2-roll laboratory rubber mill (2.5" diameter rolls) was used. Total milling time at 150°-170° F. was about 25 minutes and the mixture of carbon black and MTMAB was added near the end of the milling period. A second composition (control) was formulated using a conventional soap/sulfur cure system for comparative purposes. All of the ingredients in the formulation were the same except that 4 phr red oil soap (sodium oleate manufactured by National Purity Soap and Chemical Co.) was substituted for the MTMAB. Specimens of both compositions were then vulcanized in a press at 170° C. Tensile strength (psi) and elongation (%) values of the cured specimens were as follows:

|  | Tensile/Elongation | Tensile/Elongation (Control) |
| --- | --- | --- |
| 15 min. | 1700/190 | 1970/270 |
| 30 min. | 1870/120 | 2080/280 |
| 60 min. | 2010/120 | ND |

ND = not determined

From a comparison of the physical properties of the control with those of the formulation of the present invention, it is evident that the quaternary ammonium salt/sulfur cure system yields vulcanizates having tensile strengths which compare favorably with those obtained using a conventional soap/sulfur cure system although at a somewhat slower rate under the conditions chosen.

EXAMPLE II

To demonstrate the ability to cure ethylene-vinyl acetate-vinyl chloroacetate terpolymers utilizing the quaternary ammonium salt/sulfur cure systems of the present invention the following formulation was prepared:

|  | Parts |
| --- | --- |
| E/VA/VCA Elastomer | 100 |
| Agerite Resin D (trademark) | 1.0 |
| Sulfur | 0.3 |
| Stearic Acid | 2.0 |
| Carbon Black | 46.0 |
| Mixture of: |  |
| Carbon Black | 4.0 |
| MTMAB | 3.0 |

The E/VA/VCA terpolymer (MV 36.5) contained 64.3 percent vinyl acetate and 0.71 percent chlorine. The mixture of the quaternary ammonium salt and carbon black was the last ingredient added to the mixture. Milling was continued for about five minutes after addition of the last ingredient. Total milling time was about 25 minutes. The compounded elastomer was then removed from the mill and cooled. Specimens were press-cured at 170° C. for 15, 30, 60 and 90 minutes. Tensile and elongation values obtained for the vulcanizates were as follows:

|  | Tensile/Elongation |
| --- | --- |
| 15 min. | 1340/380 |
| 30 min. | 1500/330 |
| 60 min. | 1530/300 |
| 90 min. | 1590/290 |

EXAMPLE III

To demonstrate the ability to enhance the cure rate of ethylene-vinyl acetate-vinyl chloroacetate terpolymer by varying the formulation, Example II was repeated utilizing a different quaternary ammonium salt. The terpolymer contained 65.5 weight percent vinyl acetate, 1.03 weight percent chlorine and had an MV of 45. For this example methyltrialkyl ($C_{8-10}$) ammonium chloride (MTAAC) was substituted for the MTMAB. The formulation was as follows:

|  | Parts |
| --- | --- |
| E/VA/VCA Elastomer | 100 |
| Agerite Resin D (trademark) | 1.0 |
| Sulfur | 0.3 |
| Stearic Acid | 2.0 |
| Carbon Black | 50.0 |
| MTAAC | 4.0 |

Milling was carried out in the conventional manner except that the quaternary ammonium salt was added by itself, i.e., not mixed with a portion of the carbon black. The ingredients were added in the order they are set forth in the table. Upon curing at 170° C. the following tensile and elongation values were obtained.

|  | Tensile/Elongation |
| --- | --- |
| 3 min. | 1370/450 |
| 7 min. | 1500/410 |
| 15 min. | 1530/380 |
| 30 min. | 1570/390 |

It is apparent from a comparison of the above data with that obtained in Example I that the cure rate can be significantly improved by changing the quaternary ammonium salt. Other formulation changes are also possible to further enhance the cure rate.

EXAMPLE IV

To further demonstrate the ability to vary the formulation, the following were added to a two-roll rubber mill maintained at 150°-170° F.:

|  | Parts |
| --- | --- |
| E/VA/VCA Elastomer | 100 |
| Agerite Resin D (trademark) | 1.0 |
| Sulfur | 0.83 |
| MTMAB | 5.0 |
| Stearic Acid | 2.0 |
| Carbon Black | 41.0 |

The ingredients were added in the order indicated. After addition of the quaternary ammonium salt, the compound appeared as a wrinkled crepe on the mill. However, upon addition of the remaining ingredients and after completion of the milling (total milling time about 25 minutes) the compound had a normal consistency and banded evenly on the mill rolls. The composition cured at 170° C. without difficulty.

We claim:

1. A process for vulcanizing a saturated elastomer having active halogen-containing cure sites selected from the group consisting of copolymers of ethylene and a vinyl ester of from 3 to 6 carbon atoms and having active halogen-containing cure sites incorporated therein by polymerizing a vinyl monomer containing said halogen-containing group or by chemically modifying the copolymer by reacting a portion of the ester groups with a halogen-containing reagent and poly(ethyl acrylate) or a copolymer or ethyl acrylate with n-butyl acrylate and having active halogen-containing cure sites incorporated therein by copolymerizing or terpolymerizing a vinyl monomer containing said halogen-containing group which comprises combining said elastomer with 0.05 to 2.5 sulfur and 0.05 to 7 phr quaternary ammonium salt corresponding to the formula

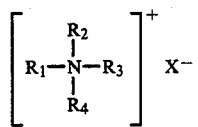

wherein $R_1$, $R_2$, $R_3$ and $R_4$ are hydrocarbon radicals having from 1 to 18 carbon atoms and $X^-$ is $Cl^-$, $Br^-$, $I^-$, $HSO_4^-$, or $H_2PO_4$ and hating said mixture at a temperature from about 100° C. to about 250° C. to effect vulcanization.

2. The process of claim 1 wherein the vulcanization is carried out at a temperature from 130° C. to 200° C.

3. The process of claim 2 wherein the elastomer contains α-chloroacetoxy groups and 0.3 to 1.5 weight percent chlorine selected from the group consisting of ethylene-vinyl acetate copolymers and ethyl acrylate homopolymers and copolymers.

4. The process of claim 3 wherein the saturated elastomer contains 25 to 100 phr filler/reinforcing agent.

5. The process of claim 4 wherein the saturated elastomer contains 2 to 6 phr quaternary ammonium salt, 0.2 to 1.3 phr sulfur, 0.25 to 1.5 phr antioxidant, 1 to 3 phr $C_{12-18}$ fatty acid or mixture of $C_{12-18}$ fatty acids, and 30 to 60 phr carbon black.

* * * * *